United States Patent
Sowards-Emmerd et al.

(10) Patent No.: US 10,379,228 B2
(45) Date of Patent: Aug. 13, 2019

(54) PET DETECTOR SCINTILLATOR ARRANGEMENT WITH LIGHT SHARING AND DEPTH OF INTERACTION ESTIMATION

(71) Applicants: KONINKLIJKE PHILIPS N.V., Eindhoven (NL); UNIVERSITY OF WASHINGTON, Seattle, WA (US)

(72) Inventors: David Sowards-Emmerd, San Jose, CA (US); Adrienne Lehnert, Seattle, WA (US); William Hunter, Seattle, WA (US); Robert Miyaoka, Seattle, WA (US); Lingxiong Shao, Saratoga, CA (US); Thomas Leroy Laurence, North Royalton, OH (US)

(73) Assignees: KONINKLIJKE PHILIPS N.V., Eindhoven (NL); UNIVERSITY OF WASHINGTON, Seattle, WA (US)

( * ) Notice: Subject to any disclaimer, the term of this patent is extended or adjusted under 35 U.S.C. 154(b) by 11 days.

(21) Appl. No.: 15/518,577

(22) PCT Filed: Oct. 14, 2015

(86) PCT No.: PCT/IB2015/057843
§ 371 (c)(1),
(2) Date: Apr. 12, 2017

(87) PCT Pub. No.: WO2016/059557
PCT Pub. Date: Apr. 21, 2016

(65) Prior Publication Data
US 2017/0234990 A1 Aug. 17, 2017

Related U.S. Application Data
(60) Provisional application No. 62/065,164, filed on Oct. 17, 2014.

(51) Int. Cl.
*G01T 1/164* (2006.01)
*G01T 1/20* (2006.01)
*G01T 1/202* (2006.01)

(52) U.S. Cl.
CPC .............. *G01T 1/1644* (2013.01); *G01T 1/20* (2013.01); *G01T 1/202* (2013.01); *G01T 1/2018* (2013.01)

(58) Field of Classification Search
CPC .................................................. G01T 1/1644
See application file for complete search history.

(56) References Cited

U.S. PATENT DOCUMENTS

| 7,956,331 B2 | 6/2011 | Lewellen |
| 8,476,600 B2 | 7/2013 | Lee |

(Continued)

FOREIGN PATENT DOCUMENTS

WO  2006064393  6/2006

OTHER PUBLICATIONS

Miyaoka, et al., "Effect of detector scatter on the decoding accuracy of a DOI detector module", Nuclear Science Symposium, 1999.

*Primary Examiner* — David P Porta
*Assistant Examiner* — Carolyn Fin

(57) ABSTRACT

A photon detector includes a sensor array of optical sensors disposed in a plane and four substantially identical scintillation crystal bars. Each optical sensor is configured to sense luminescence. Each of the four scintillator crystal bars being a rectangular prism with four side surfaces and first and second end surfaces, each scintillation bar has two side surfaces which each face a side surface of another scintillation bar, and each scintillation crystal bar generating a light scintillation in response to interacting with a received gamma photon. A first layer (80) is disposed in a first plane disposed between and adjacent facing side surfaces of the (Continued)

four substantially identical scintillation crystal bars with a light sharing portion (82) adjacent the first end surface and a reflective portion (84) adjacent the second end surface. A second layer (68) is disposed in a second plane orthogonal to the first plane and disposed between and adjacent facing side surfaces of the four substantially identical scintillation crystal bars with a light sharing portion (88) adjacent the second end surface and a reflective portion (90) adjacent the first end surface.

16 Claims, 9 Drawing Sheets

(56) References Cited

U.S. PATENT DOCUMENTS

| | | |
|---|---|---|
| 2007/0090298 A1 | 4/2007 | Shao |
| 2010/0148074 A1 | 6/2010 | Menge |
| 2010/0270463 A1 | 10/2010 | Lee |
| 2011/0121184 A1 | 5/2011 | Inadama |
| 2011/0155918 A1* | 6/2011 | Bouhnik ............... G01T 1/249 250/370.14 |
| 2012/0061577 A1 | 3/2012 | Oleinik |
| 2012/0235047 A1* | 9/2012 | Lewellen ............... A61B 6/037 250/366 |
| 2012/0318988 A1 | 12/2012 | Taghibakhsh |
| 2015/0090888 A1* | 4/2015 | Yang ..................... G01T 1/20 250/362 |

\* cited by examiner

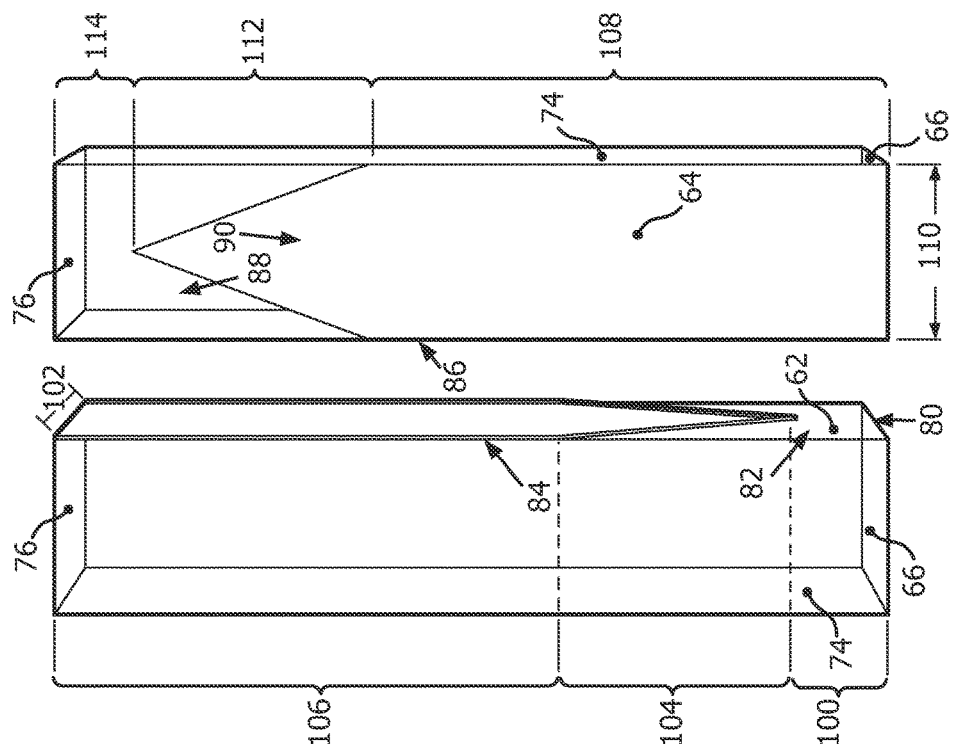
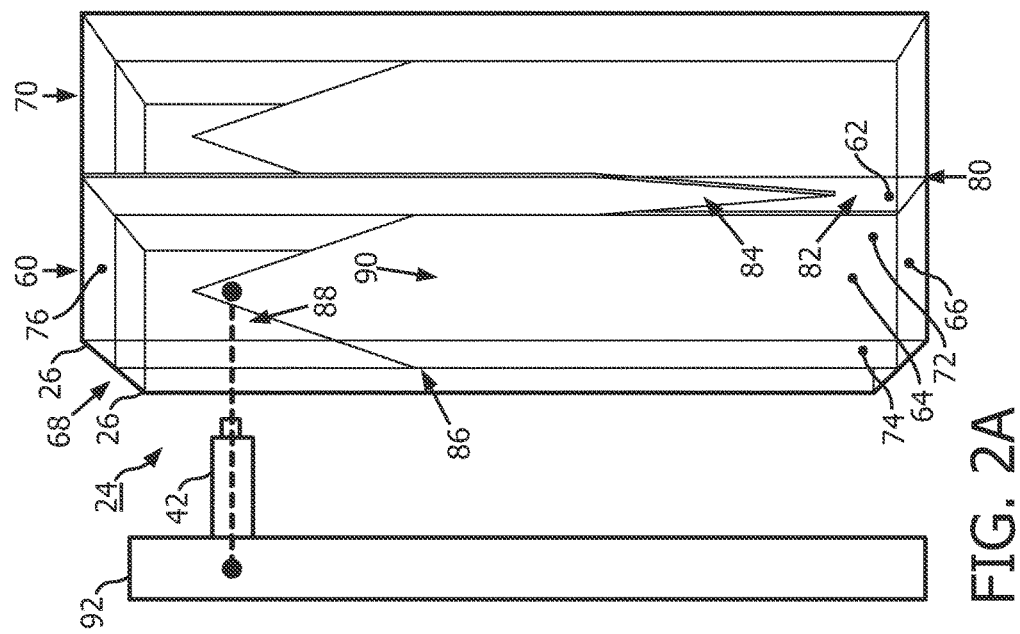
FIG. 2A
FIG. 2B

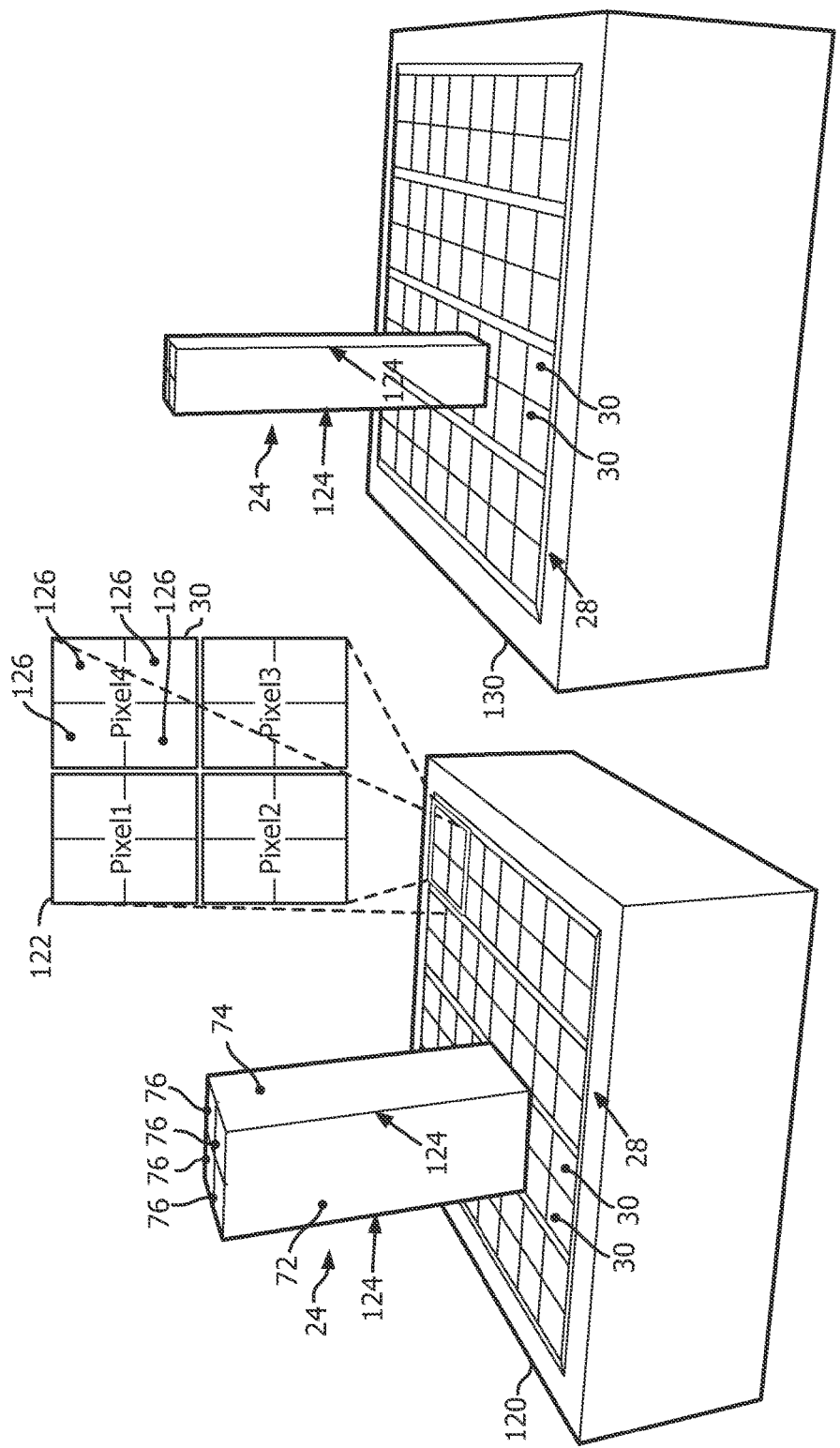

PET DETECTOR SCINTILLATOR ARRANGEMENT WITH LIGHT SHARING AND DEPTH OF INTERACTION ESTIMATION

CROSS REFERENCE TO RELATED APPLICATIONS

This application is the U.S. National Phase application under 35 U.S.C. § 371 of International Application No. PCT/IB2015/057843, filed Oct. 14, 2015, published as WO 2016/059557 on Apr. 21, 2016, which claims the benefit of U.S. Provisional Patent Application No. 62/065,164 filed Oct. 17, 2014. These applications are hereby incorporated by reference herein.

BACKGROUND

The following relates generally to nuclear medicine medical imaging. It finds particular application in conjunction with Positron Emission Tomographic (PET) detectors and localization of positron annihilation events, and will be described with particular reference thereto. However, it will be understood that it also finds application in other usage scenarios and is not necessarily limited to the aforementioned application.

In PET imaging, a subject is injected with a radiopharmaceutical targeting metabolic processes. The radiopharmaceutical accumulates in the targeted tissues and emits positrons as the radiopharmaceutical decays. The positron interacts with an electron in an annihilation event, which generates two gamma photons of 511 keV energy directed 180° opposite to each other. During the period of pharmaceutical decay, the subject is placed in an imaging device or scanner, which includes detectors that detect the generated gamma photons. The imaging device typically includes rings of detectors which encircle a length of the subject.

The detectors detect each gamma photon at a detector location or pixel, with a time and an energy level. Time windows and energy windows are applied to detected photons to determine coincident event pairs of gamma photons, i.e. two photons from the same annihilation event. Coincident event pairs define the lines of response (LORs), which are used to localize the annihilation event. Time-of-flight (TOF) PET detectors use precision in the detected timing to further localize the annihilation event along the LORs.

Detectors typically include scintillation crystals of a three-dimensional rectangular shape, which receive the gamma photons through a surface of the crystal facing the center of the detector ring. The gamma photon interacts with the molecules within the crystal, which converts the gamma photon or scintillates to generate luminescence. The generated luminescence or light is sensed by an optical sensor located on an opposite crystal face from the center facing surface. The crystals are sized of a sufficient dimension between the center facing and the sensor facing surface, such that the scintillation will occur somewhere in between the surfaces defined as a depth of interaction (DOI). For example, the crystals are typically long, rectangular bars with the smaller end center facing surface receiving the gamma photon, and with the opposite smaller end surface coupled to one or more optical sensors, which convert the sensed luminescence to an energy value and a time value measuring the received gamma photon. The scintillation or DOI occurs according to a distribution along the depth or length between the center facing surface and the optical sensor coupled facing surface, which varies by crystal. Systems typically use a fixed center point between the center facing surface and the coupled facing surface of the scintillation crystals for each end point of the LORs, which introduces error into the LOR, such as parallax error.

BRIEF SUMMARY

One approach to estimating the DOI includes a side-by-side crystal pair arrangement with a portion of a surface between each adjacent crystal including light sharing, and the remaining portion is opaque and shaped in an isosceles triangle with a base at the sensor end of the shared face and an apex extending towards the center facing surface of the crystal. As the scintillation crystal scintillates, light is shared with the paired crystal according to the depth of interaction of the detected event. Each crystal is optically coupled with an optical sensor which measures the light output. The DOI is estimated as a ratio of amount of light sensed from the scintillated crystal to the total amount of light for both crystals.

Another approach uses larger crystal arrays, such as 14×14 with light sharing surfaces between adjacent crystals, and to side calibrate the crystal array in a continuous DOI measurement. However, the larger arrays with broader light sharing impact timing resolution. Timing resolution is based on the sensed light output peak in a full width at half maximum (FWHM) measure used to determine a time of detection. As the light sharing increases, the peak broadens and the timing resolution broadens, i.e. decreases precision of the detected time. Moreover, the continuous DOI with the side measurement involves a more complex computation which affects system throughput, and the side measurement is difficult, if not impossible, in a ring of detectors disposed side by side.

The following discloses a new and improved PET detector scintillator arrangement with light sharing and depth of interaction estimation that addresses the above referenced issues, and others.

In accordance with one aspect, a photon detector includes a sensor array of optical sensors disposed in a plane and four substantially identical scintillation crystal bars. Each optical sensor is configured to sense luminescence. Each of the four scintillator crystal bars being a rectangular prism with four side surfaces and first and second end surfaces, each scintillation bar has two side surfaces which each face a side surface of another scintillation bar, and each scintillation crystal bar generating a light scintillation in response to interacting with a received gamma photon. A first layer is disposed in a first plane disposed between and adjacent facing side surfaces of the four substantially identical scintillation crystal bars with a light sharing portion adjacent the first end surface and a reflective portion adjacent the second end surface. A second layer is disposed in a second plane orthogonal to the first plane and disposed between and adjacent facing side surfaces of the four substantially identical scintillation crystal bars with a light sharing portion adjacent the second end surface and a reflective portion adjacent the first end surface.

In accordance with another aspect, a method of detecting photons includes scintillating a photon from a detected event at a depth in one of four substantially identical scintillation crystal bars in a scintillator array. Each of the four scintillator crystal bars being a rectangular prism with four side surfaces and first and second end surfaces. Each scintillation bar having two side surfaces which each face a side surface of another scintillation bar. Each scintillation crystal bar generates a light scintillation in response to interacting with a received gamma photon. The scintillator array includes a first layer disposed in a first plane disposed between and adjacent facing side surfaces of the four substantially identical scintillation crystal bars with a light sharing portion adjacent the first end surface and a reflective portion adjacent the second end surface, and a second layer disposed in a second plane orthogonal to the first plane and disposed between and adjacent facing side surfaces of the four substantially identical scintillation crystal bars with a light sharing portion adjacent the second end surface and a reflective portion adjacent the first end surface. A depth of the gamma photon scintillation in the one of the four substantially identical scintillation crystal bars is estimated based on a ratio of sensed luminescence of the two of the four substantially identical scintillation crystal bars diagonal to each other and facing the one of four substantially identical scintillation crystal bars by a sensor array of optical sensors disposed in a plane. Each optical sensor is configured to sense luminescence.

In accordance with another aspect, a gamma photon detection system includes gamma photon detectors disposed around an imaging region configured to receive a subject to be imaged and one or more processors. Each detector includes four scintillation crystals that are each partially optically coupled with two adjacent scintillation crystals. Each scintillation crystal being optically coupled with one of the two adjacent scintillation crystals to preferentially pass light adjacent an entrance end and coupled with the other of the two adjacent scintillation crystals to preferentially pass light adjacent an optical sensor end, the scintillation crystals scintillating light in response to interacting with a gamma photon, and optical sensors optically coupled with the optical sensor ends of the scintillation crystals. The one or more processors are connected with the optical sensors configured to determine a depth at which the interaction with the gamma photon occurs in the scintillating crystal from a ratio of output signals from the optical sensors, which are optically coupled with the two scintillation crystals that are partially optically coupled to the scintillating crystal.

One advantage is a detector crystal arrangement with DOI estimation for in use detector rings.

Another advantage resides in the detector crystal arrangement with excellent timing resolution.

Another advantage resides in excellent spatial resolution.

Another advantage resides in a simplified computation of DOI.

Still further advantages will be appreciated to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIGS. 2A and 2B schematically illustrate an embodiment of the photon detector scintillator arrangement with light sharing and a side calibration.

FIGS. 3A and 3B schematically illustrate various embodiments of the photon detector scintillator arrangement and sensor coupling.

DETAILED DESCRIPTION

Figure 1:
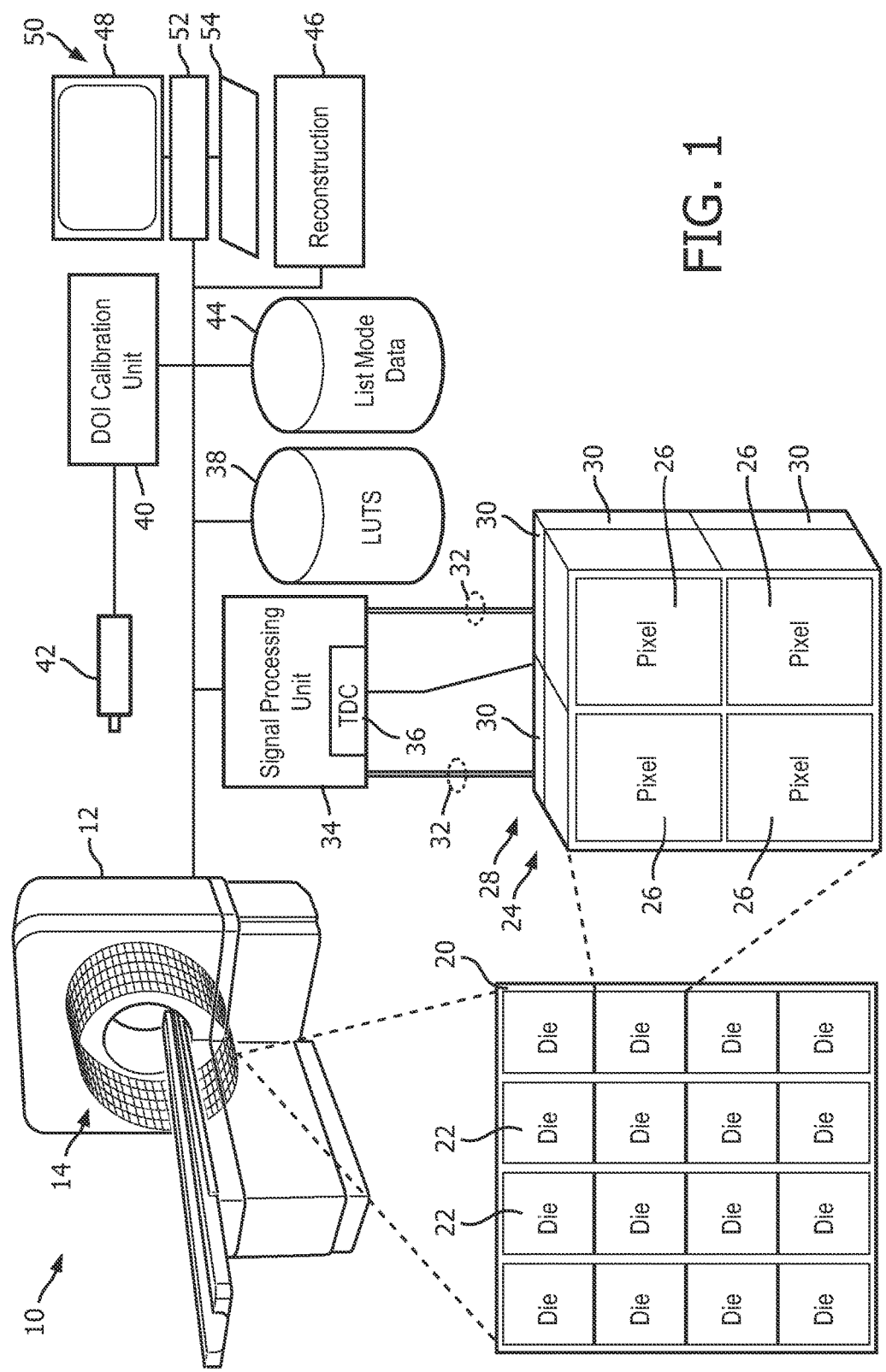
FIG. 1 schematically illustrates an embodiment of a photon detector scintillator arrangement with light sharing and depth of interaction estimation system.

With reference to FIG. 1, an embodiment of a photon detector scintillator arrangement with light sharing and depth of interaction estimation system 10 is diagrammatically illustrated. The system 10 includes a positron emission tomography scanner or imaging device 12, which includes one or more detector rings 14 circumscribing an imaging region 16 shown in perspective with the detector rings 14 exposed. The imaging region 16 receives a subject supported on a subject support 18 and the subject, injected with a radiopharmaceutical, emits gamma photons received by the detector rings 14.

Each detector ring 14 includes detector tiles 20 arranged circumferentially around the imaging region 16. Each detector tile 20 includes a two-dimensional arrangement of dies 22 shown in an exploded center facing view. Each die 22 includes a scintillator array 24 of four substantially identical scintillator crystal bars 26, such as LYSO (lutetium-yttrium oxy-orthosilicate), Lutetium Oxy-Orthosilicate (LSO), Lutetium Gadolinium Oxy-Orthosilicate (LGSO), Lutetium Gadolinium Yttrium Oxy-Orthosilicate (LGYSO), Lanthanum Bromide (LaBr), or Bismuth Germanate (BGO), shown in a further exploded perspective view. Each substantially identical scintillator crystal bar 26 corresponds to one pixel or detector location.

The scintillator array 24 of four substantially identical scintillator crystal bars 26 is coupled to a sensor array 28 of optical sensors 30, such as digital or analog sensors, for example, silicon photomultipliers (SiPM), avalanche photodiodes (APDs), photomultiplier tubes (PMTs), and the like. In one embodiment, each substantially identical scintillator crystal bar 26 is coupled to one optical sensor 30, i.e. one-to-one correspondence. The sensor array 28 of optical sensors 30 is disposed in a plane. In another embodiment, one substantially identical scintillator crystal bar 26 is coupled to four optical sensors 30. Each optical sensor 30 generates a signal indicative of the sensed luminescence independently through a separate input 32 to a signal processing unit 34. The optical sensors 30 of each die 20 connect to one time-to-digital converter (TDC) 36 of the signal processing unit 34

The signal processing unit, processor, circuitry, or means 34 receives signals from the optical sensors 30 and generates a total energy value, a time value, a location indicator including the pixel or the detector location for each detected event or photon scintillation. The energy values and the location indicator correspond to one of the four substantially identical scintillator crystal bars 26. The location indicator includes a depth of interaction estimate for each event. A total energy value is a sum of the sensed luminescence converted to energy values from the scintillator array 24 of four substantially identical scintillator crystal bars 26. The TDC 36 generates the time value, i.e. timestamp, for each scintillation photon or detected event by one of the substantially identical scintillator crystal bars 26. The output of the four optical sensors 30 can be ORed, such that a single time stamp is generated per event, indicating a time of a first output from the four optical sensors.

The signal processing unit 34 estimates the depth of interaction or scintillation based on a ratio of sensed luminescence from two other of the four substantially identical scintillator crystal bars 26, which are diagonal to each other and facing the scintillating crystal. The signal processing unit 34 uses look-up tables (LUTs) 38 stored in a computer memory, which relate calibrated ratios of sensed luminescence for each substantially identical scintillator crystal bar 26 to corresponding discrete values of depth of interaction. The computed ratio and use of the LUTS 38 provide a fast and efficient conversion of sensed luminescence to a depth of interaction estimate.

The LUTS 38 are constructed and/or revised by a DOI calibration unit, processor, apparatus, or means 40. The DOI calibration unit 40 includes an electronically collimated monoenergetic (511 keV) radiation beam 42, such as a sodium-22 point source. During manufacture of the detector tiles 20, each substantially identical scintillator crystal bar 26 disposed in the scintillator array 24 is side calibrated with the electronically collimated radiation beam 42 at different depths. The DOI calibration unit 40 uses a ratio of the sensed luminescence from the two diagonal crystals receiving shared light or shared luminescence from the scintillating crystal at a calibrated depth determined by a radiation beam 42 beam directed from the source at the side of the scintillating crystal. The DOI calibration unit 40 inputs the calibrated radiation beam depths and distribution of calibrated ratios, and constructs the LUTS 38, which include discrete values of the calibrated ratios and the corresponding depths of interaction. After manufacture, the dies 20, which optically isolate the scintillator arrays 24, complicate side calibration, as inner crystals are shielded by outer crystals. The DOI calibration unit 40 uses a front calibration to validate and/or revise the LUTS 38 after manufacture. For example, the radiation beam directed to the front facing surface of a scintillating crystal generates ratios of sensed luminescence with a distribution of depths and a corresponding distribution of light sharing between the scintillating crystal and the diagonal crystals. The front calibration distribution of ratios can be compared with the distribution represented by the LUTS 38 and the LUTS validated and/or revised.

The signal processing unit 34 stores the total energy value, the time value and the location indicator with the depth of interaction estimate in list mode data store 44, such as a computer memory. That is, for each event, the location of the scintillator that received the gamma photon (determined from the first sensor to sense light), the time value or stamp of the first detecting light by any of the optical sensors 30, a total energy (amount of light) from all of the coupled optical sensors of the scintillator array 24 (which can be used to screen for valid radiation photons), and the DOI are stored. The computer memory of the LUTS 38 and the list mode data 44 are suitably embodied by non-transitory computer storage mediums, such as solid state storage, disk storage, local storage, cloud storage, server storage, and the like.

A reconstruction unit, processor or means 46 receives the list mode data 44 and reconstructs one or more images, which are displayed on a display device 48 of a computing device 50, such as a workstation, desktop computer, laptop, tablet, mobile computing device, network connected distributed computing devices, and the like. In addition to normal image reconstruction processing, the reconstruction unit 46 adjusts the end points of each LOR and/or the time values for the end points based on the DOIs. The computing device 50 includes a data processor 52, such as an electronic data processor, optical processor, and the like, and one or more input devices 54, such as a mouse, keyboard, touch screen, microphone, and the like. The processors of the signal processing unit 34, DOI calibration unit 40, and the reconstruction unit 46 can include non-transitory storage medium storing instructions (e.g., software) readable by the data processor 52 and executable by the data processor 52.

With reference to FIG. 2A, an embodiment of the photon detector scintillator arrangement with light sharing is shown in a see-through perspective view. The scintillator array 24 of the four substantially identical scintillator crystal bars 26 is oriented in the FIG. 2A with one 60 of the four substantially identical scintillator crystal bars 26 to the front left. Each of the four substantially identical scintillator crystal bars 26 includes a first side surface 62 and a second side surface 64 orthogonal to the first side surface 62, and a sensor end surface 66 orthogonal to the first side surface 62 and second side surface 64 and optically coupled to the array 28 of the optical sensors 30. The first side surface 62 and the second side surface 64 are parallel to and facing two other 68, 70 of the four substantially identical scintillator crystal bars 26, i.e. 2×2 scintillator array. The third side surface 72 is opposite the second side surface 64, and the fourth side surface 74 is opposite the first side surface 62. An entrance end surface 76 or center facing surface is opposite the sensor end surface 66 and receives the gamma photon that scintillates at a depth between the entrance end surface 76 and the sensor end surface 66. Each of the four substantially identical scintillator crystal bars 26 is sized with a long axis between the sensor end surfaces 66, 76. For example, with a 4×4×22 mm crystal, the end surfaces are oriented with 4×4 surfaces and 22 mm in between.

The scintillator array 24 of the four substantially identical scintillator crystal bars 26 includes a first layer 80 disposed in a plane positioned between and adjacent the facing side surfaces with a light sharing portion 82 adjacent and orthogonal to the sensor end surface 66 and a remaining reflective portion 84. A second layer 86 is disposed in an orthogonal plane to the first layer 80 and positioned between and adjacent the facing side surfaces with a light sharing portion 88 adjacent and orthogonal to the entrance end surface 78 and a remaining reflective portion 90. In one embodiment, the light sharing portion 82 of the first layer 80 and/or the light sharing portion 88 of the second layer 86 are repeated between pairs of substantially identical scintillator crystal bars 26. In another embodiment, the light sharing portion 82 of the first layer 80 and the light sharing portion 88 of the second layer 86 are asymmetrical and/or different.

During side calibration, the third side surface 72 and the fourth side surface 74 are exposed to the collimated monoenergetic photon beam directed at the center line of the one 60 crystal. The monoenergetic photon beam may be electronically collimated through coincidence with a photodetector 92. Light in the one 60 crystal is shared with the two other 68, 70 crystals through the light sharing portions 82, 88 and sensed by corresponding optical sensors 30 of the two other 68, 70 crystals.

With reference to FIG. 2B, an embodiment of the photon detector scintillator arrangement with light sharing is illustrated in a break-apart view of half of the scintillator array 24. The substantially identical scintillator crystal bar 26 shown on the left includes the first layer 80 on the first side surface 62 is divided into three segments. The light sharing portion 82 is oriented toward the sensor end surface 66.

A first segment 100 is light sharing and includes a rectangular area from edge to edge 102 and extending a length, such as 2.0 mm, from the sensor end surface 66. A second segment 104 is partially light sharing and includes a reflective area, e.g. reflective film, shaped in an isosceles triangle with an apex of a height, such as 6.0 mm, extending towards the first segment 100, and a base edge to edge 104 and extending towards a third segment 106. The reflective area is reflective on both sides. The remaining area in the second segment 104, e.g. right triangles on either side of the isosceles triangle, are light sharing areas. In other embodiments, different geometric shapes are contemplated for the reflective area of the second segment 104, such as a half circle or ellipse, half of a polygon, trapezoid, etc. The third segment 106 includes a rectangular reflective area from edge to edge 102 and extending a length, such as 14 mm, from the base of the isosceles triangle to the entrance end surface 76.

The substantially identical scintillator crystal bar 26 shown on the right includes the second layer 86 on the second side surface 64 and is divided into three segments. The light sharing portion 88 is oriented toward the entrance end surface 76.

A first segment 108 is reflective and includes a rectangular area from edge to edge 110 and extending a length, such as 14.0 mm, from the sensor end surface 66. A second segment 112 includes a reflective area, e.g. reflective film, shaped in an isosceles triangle with a base edge to edge 110 extending from the first segment 108, and an apex of a height, such as 6.0 mm, extending towards a third segment 114. The reflective area is reflective on both sides. The remaining area in the second segment 112, e.g. right triangles on either side of the isosceles triangle, are light sharing areas. In other embodiments, different geometric shapes are contemplated for the reflective area of the second segment 112, such as a half circle or ellipse, half of a polygon, trapezoid, etc. The third segment 114 includes a rectangular light sharing area from edge to edge 102 and extending a length, such as 14 mm, from the apex of the isosceles triangle to the entrance end surface 76. In other embodiments, the length of the first segment 100 of the first side surface 62 and the length of the third segment 114 of the second side surface 62 are different. In other embodiments, the height of the isosceles triangle or dimensions of another geometric shape and/or the geometric shape of the second segment 104 of the first side surface 62 differs from the height of the isosceles triangle, dimensions of another geometric shape, and/or the geometric shape employed in the second segment 112 of the second side surface 64.

With reference to FIG. 3A, an embodiment of the photon detector scintillator arrangement and sensor coupling in a digital photon counting detector tile 120 is illustrated in perspective with an exploded two-dimensional view 122 of the optical sensors 30 of one die 122. The digital photon counting detector tile 120 is shown with the sensor array 28 exposed and with one scintillator array 26 in a one-to-one coupling between the substantially identical scintillator crystal bar 26 and the optical sensor 30. The sensor array 28 can be implemented for each detector tile 20. Each optical sensor 30 includes a two-dimensional array of photodiodes, which generate a combined signal of sensed luminescence from one coupled substantially identical scintillator crystal bar 26. The one-to-one coupling provides a simple determination of the sensed luminescence from each substantially identical scintillator crystal bar 26.

The scintillator array 24 includes a third reflective layer 124 covering the third side surface 72 and the fourth side surface 74 of each substantially identical scintillator crystal bar 26. The third reflective layer 124 optically isolates each scintillator array 24 from adjacent scintillator arrays. The light sharing arrangement of the four substantially identical scintillator crystal bars 26 limited to each scintillator array 24 improves timing resolution over scintillator arrays with larger number of crystals, i.e. narrower signal peak of sensed luminescence.

In the exploded two-dimensional view 122, each optical sensor includes four quadrants or four sub-pixels 126. The corresponding photodiodes in each sub-pixel 126 are grouped for input to the signal processing unit 34, which uses the grouped inputs for triggering and event validation algorithms.

With reference to FIG. 3B, an embodiment of the photon detector scintillator arrangement and sensor coupling in a Silicon Photomultiplier (SiPM) detector tile 130 is illustrated in perspective. The scintillator array 24 is offset from the optical sensors 30 in a four-to-one coupling across the dies 22. The smaller crystals and offset further provides finer spatial positioning of the sensed luminescence over the one-to-one coupling described in reference to FIG. 3A.

Figure 4A:
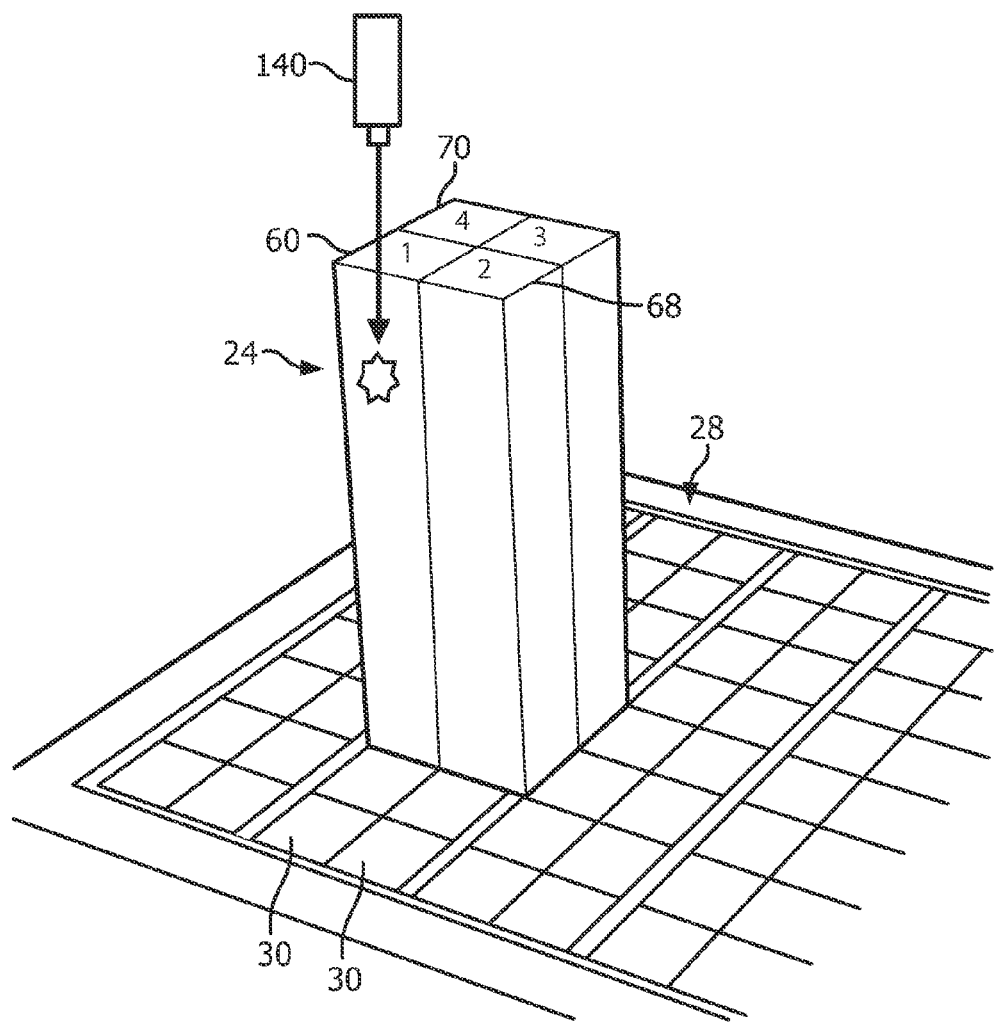
FIGS. 4A and 4B illustrate an exemplary photon detector scintillator arrangement and light sharing distribution with a front calibration.
Figure 4B:
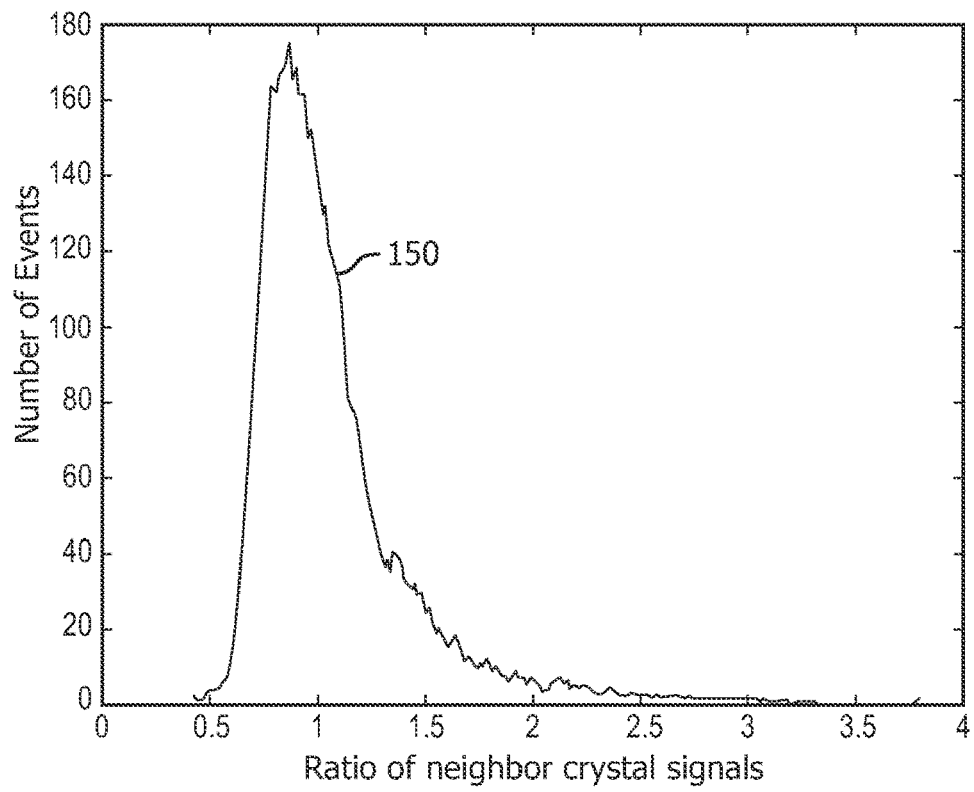

With reference to FIG. 4A, an exemplary photon detector scintillator arrangement and light sharing with a front calibration is illustrated, and a corresponding distribution graph is illustrated in FIG. 4B. A radiation source 140, such as a 511 keV gamma source, irradiates the entrance end surface 76 or center facing surface of one 60 scintillator crystal. As the gamma photons interact with the crystal, the crystal emits light. Some of the light travels through the scintillating crystal. Some of the light is shared with the two adjacent 68, 70 scintillator crystals which have a face adjacent to the one 60 and diagonal to each other. Light is shared according to the depth of interaction in the one 60 scintillator crystal and the light sharing portion 82 of the first layer 80 and the light sharing portion 88 of the second layer 86. The shared light is sensed by two of the optical sensors 30, each coupled to one of the two other 68, 70 scintillator crystals.

The photons from the radiation source are exponentially attenuated (with a known attenuation factor), with more interactions at the entrance surface than any other depth. For each scintillation crystal, the DOI distribution curve will be the same. Each detector can be calibrated by fitting its DOI distribution over a statistically significant number of gamma photons to the known distribution.

The events are sorted by the ratio and binned according to how many events we would expect in a given depth. The ratio of the shared light sensed from the adjacent scintillator crystals 68, 70 over repeated scintillations is graphed in FIG. 4B, expressed as a front calibration histogram 150. The vertical axis is the number of scintillations or events. The horizontal axis is the ratio of the shared light sensed from the 68, 70 scintillator crystals. The look-up tables 38 store calibration values for each crystal, which bring its DOI distribution curve into conformity with a nominal DOI distribution.

Figure 5:
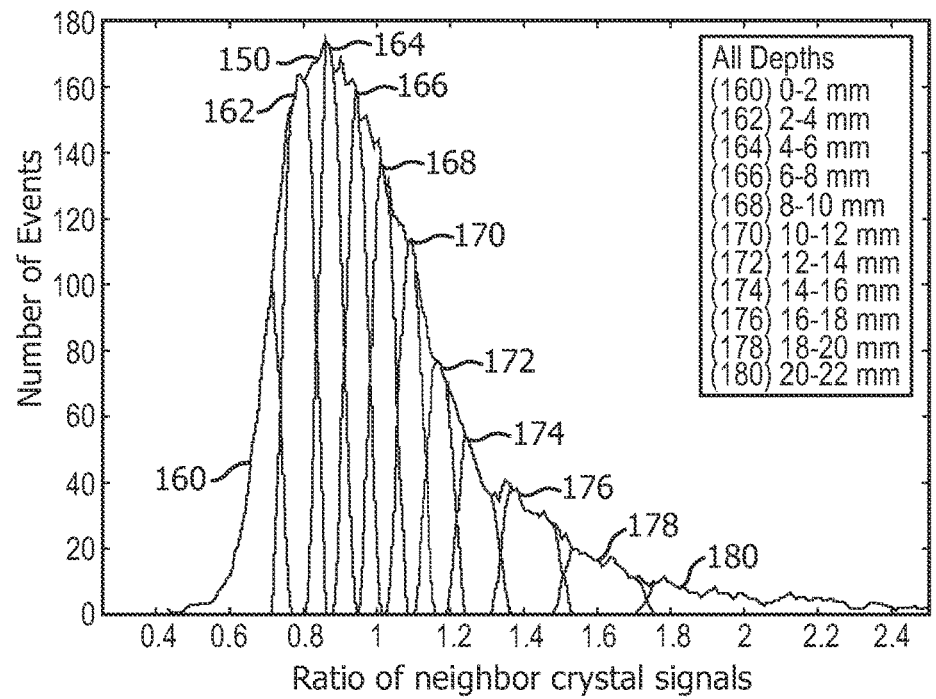
FIG. 5 illustrates an exemplary photon detector scintillator arrangement with light sharing calibration graph.

With reference to FIG. 5, an exemplary photon detector scintillator arrangement with light sharing calibration graph is illustrated with histograms 150-180. The vertical axis represents the number of scintillations. The horizontal axis represents the ratio of the shared light sensed from the 68, 70 scintillator crystals. The events in a front calibration are binned into 2 mm bins. Line 150 is the un-separated event histograms and lines 160-180 are the separated event histograms. The overlap in the binned histograms is due to graphing errors. The DOI calibration unit 40 compares the distribution of ratios from the LUTS 38 with the distribution of ratios from the front calibration histogram to validate and/or revise the LUTS 38.

In one embodiment, calibration by the DOI calibration unit 40 uses a maximum likelihood estimation algorithm. The LUTS 38 include mean and variance values based on $$\hat{x} = \arg\min_{\forall x} \min_{x=\hat{x}} \left( \frac{(m_i - \mu_i(x))^2}{\sigma_i^2(x)} \right),$$

where x is the scintillation position, m is the event signal, µ is the mean at position i, and $\sigma^2$ the sum of variance at i and the log variance.

Figure 6:
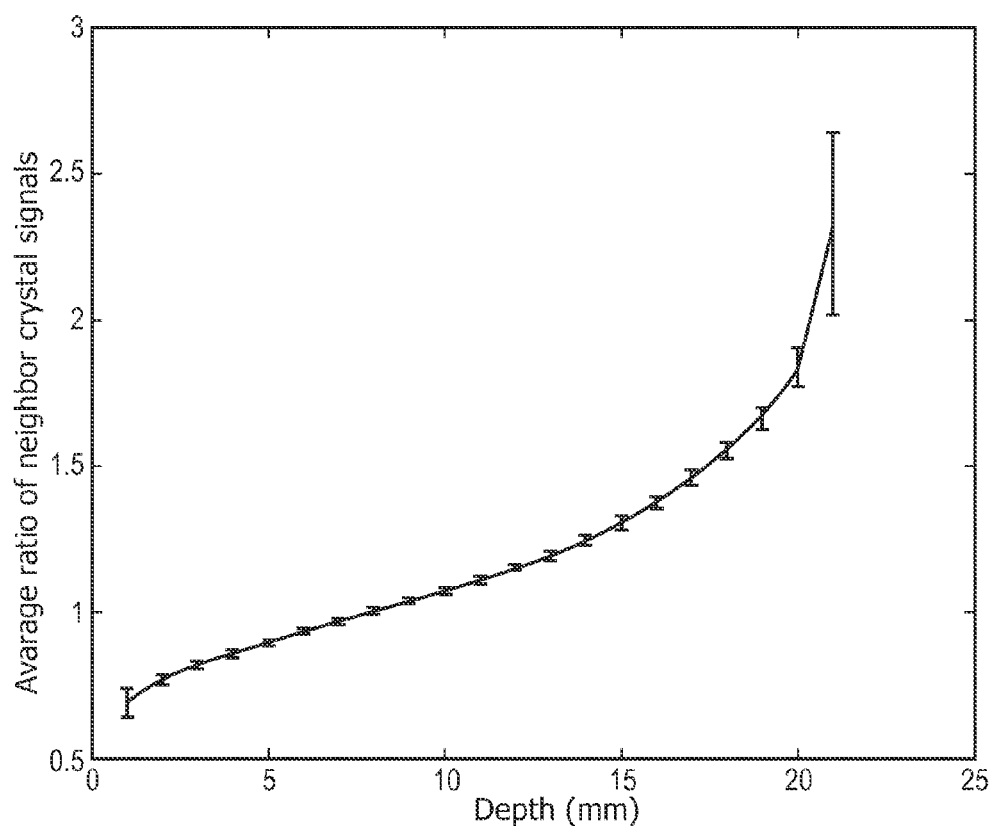
FIG. 6 illustrates an exemplary photon detector scintillator arrangement with light sharing distribution and depth of interaction calibration graph.

With reference to FIG. 6, an exemplary photon detector scintillator arrangement with light sharing distribution and depth of interaction calibration graph is illustrated. The vertical axis represents the average ratio of the shared light sensed from the two diagonal scintillator crystals 68, 70. The horizontal axis represents the calibration depths from the entrance surface calibration using the radiation source 140. The graph shows the relationship between the calibrated ratios to the depth of interactions according to the light sharing portions with the two diagonal scintillator crystals 68, 70. Averages and variances of the calibrated ratios and the depth of interactions are represented in the LUTS 38 as discrete values.

Figure 7:
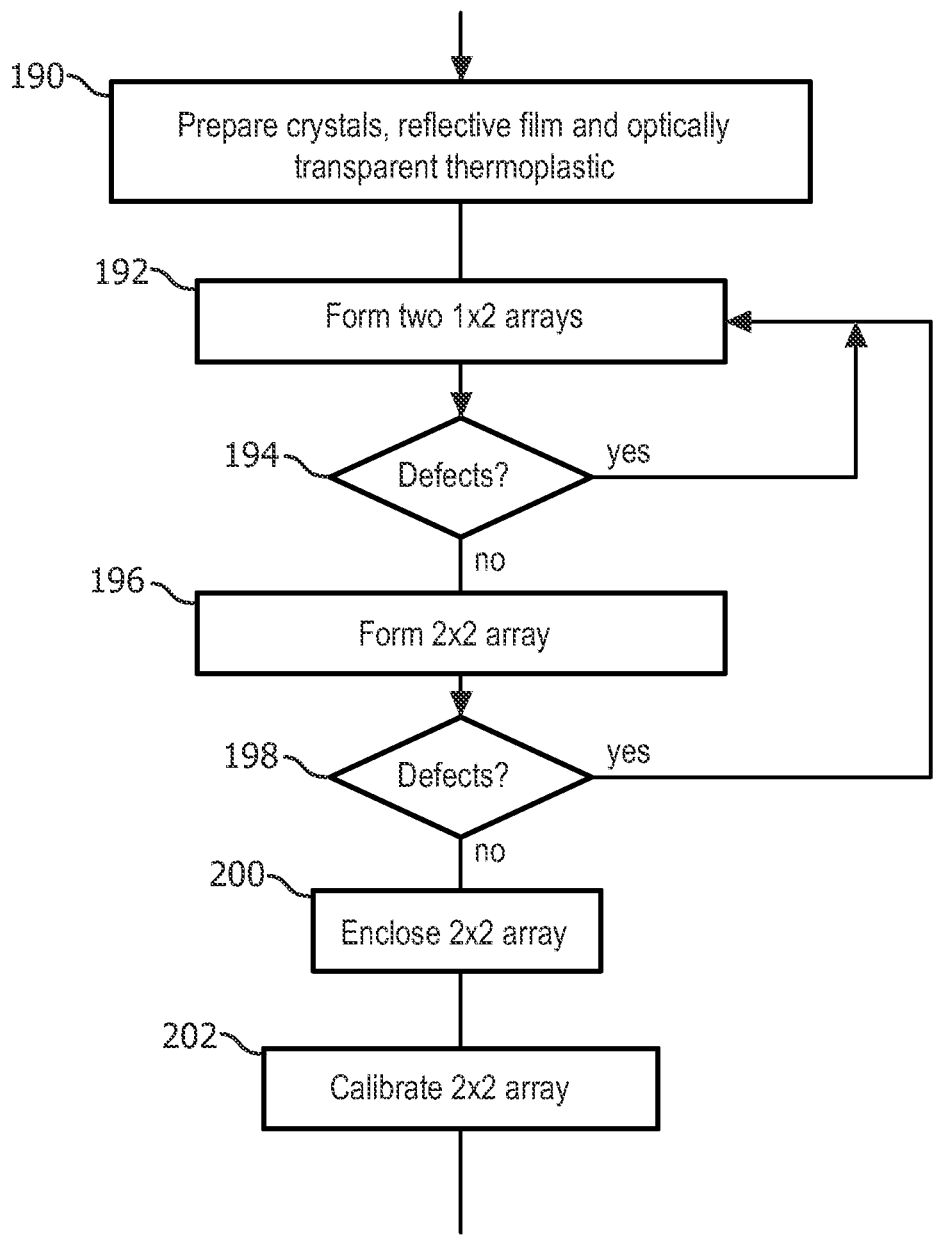
FIG. 7 flowcharts one method of an embodiment of constructing a photon detector scintillator arrangement with light sharing and depth of interaction estimation.

With reference to FIG. 7, one method of an embodiment of constructing a photon detector scintillator arrangement with light sharing and depth of interaction estimation is flowcharted. In a step 190, the substantially identical scintillator crystal bars 26, and layering material, e.g. reflective film, thermoplastic, such as Meltmount™, Teflon™, and the like are prepared. The substantially identical scintillator crystal bars 26 are cleaned. The reflective film is cut to dimensions as described in reference to FIGS. 2A and 2B.

Two 1×2 arrays are formed in a step 192 with pairs of the substantially identical scintillator crystal bars 26 and the first layer 80. The reflective film is applied to the surface and then the thermoplastic. The thermoplastic acts as a bonding agent. In a step 194, the two 1×2 arrays are checked for defects, such as bubbles in the thermoplastic, which impact light sharing between pairs.

In a step 196, the two 1×2 arrays are joined using the second layer 86. The reflective film is applied to the surface and then the thermoplastic. The 2×2 array is cleaned and inspected for defects in a step 198.

In a step 200, the scintillator array 26 is wrapped in a reflective wrapping such as Polytetrafluoroethylene (PTFE) tape, i.e. Teflon™, 3M™ mirror film material, or the like, and coupled to the sensor array 28.

In a step 202, or by the DOI calibration unit, each substantially identical scintillator crystal bar 26 is side or entrance surface calibrated. The calibrated ratios and corresponding depths are recorded. The step includes constructing the LUTS 38.

Figure 8:
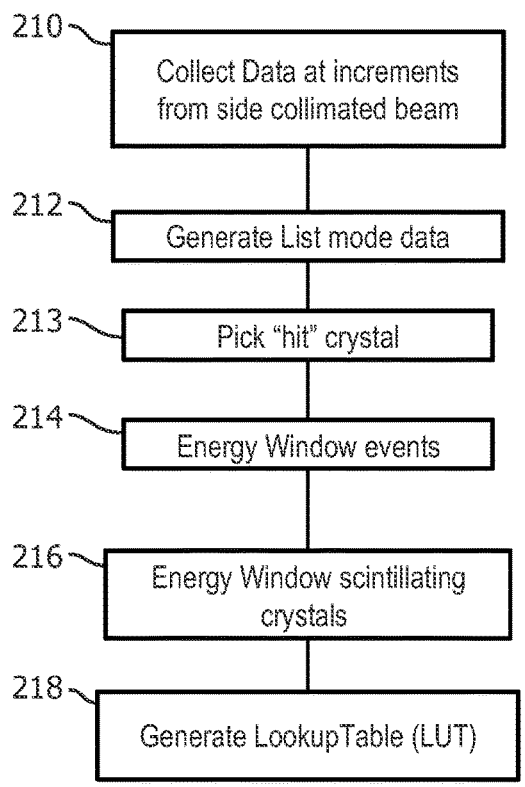
FIG. 8 flowcharts one method of an embodiment of side calibrating a photon detector scintillator arrangement with light sharing and depth of interaction estimation.

With reference to FIG. 8, one method of an embodiment of side calibrating a photon detector scintillator arrangement with light sharing and depth of interaction estimation is flowcharted. In a step 210, the electronically collimated radiation beam 42, is directed at a center of the outside surface of the one 60 crystal, i.e. centerline of the third side surface 72 or the fourth side surface 74, and the radiation beam location, e.g. depth, and sensed luminescence signal values generated.

In a step 212, or by the DOI calibration unit 40, list mode data 44 is generated, which records the detected events or photons. The list mode data 44 includes the signal energy values from each optical sensor 30, the location of the scintillating crystal or the one 60 crystal being calibrated, and the calibrated depth.

In a step 213, the "hit" crystal for each event is identified. An energy window is applied to filter events in the list mode data 44 in a step or by a module 214. In a suitable approach, the energy window fits a Gaussian distribution to the generated signals by the optical sensors 30 of the die 22 and treats events occurring in each crystal independently in order to account for differences in light collection. In general, a different event energy window may be used for each crystal (i.e. window values will depend on which crystal the event took place in, that is, for each event the energy window used will depend on the "hit" crystal identified for the event in the step 213). Such an approach suitably accounts for varying light collection depending on the crystal/sensor coupling, for example due to an offset from the exact 1-to-1 coupling. Three standard deviations (+3σ) of the generated signals of the recorded events are retained, e.g. filtered as signal values of the sensed luminescence. In one embodiment, photopeaks and Compton edge values from the reference photodetector 92 further filter the events.

An energy window is applied to filter the signals of sensed luminescence from scintillating crystal in the list mode data 44 in a step or by a module, a processor, or a circuit 216. The energy window fits a Gaussian distribution to the signals generated by the sensor 30 with the largest signal in the array. Three standard deviations, +3σ, of the generated signal values are retained, e.g. filtered as signal values of the sensed luminescence, which further minimizes Compton events in the list mode data 44.

The LUTS 38 are constructed in a step, processor, or by a module 218. A mean and a variance are calculated of the filtered sensed luminescence of each substantially identical scintillator bar 26 by calibrated depth according to each scintillating crystal. The calibrated ratios are computed from the calculated means. In one embodiment, constructing the LUTS 38 further includes refinements using interpolation, smoothing, and/or boxcar filtering of the signal values and/or calibrated depths of interaction.

The LUTS 38 can reference individual dies 22 or include multiple dies in the table with the die 22 and/or scintillator array 24 included in the location indicator, e.g. a table referencing multiple arrays.

Figure 9:
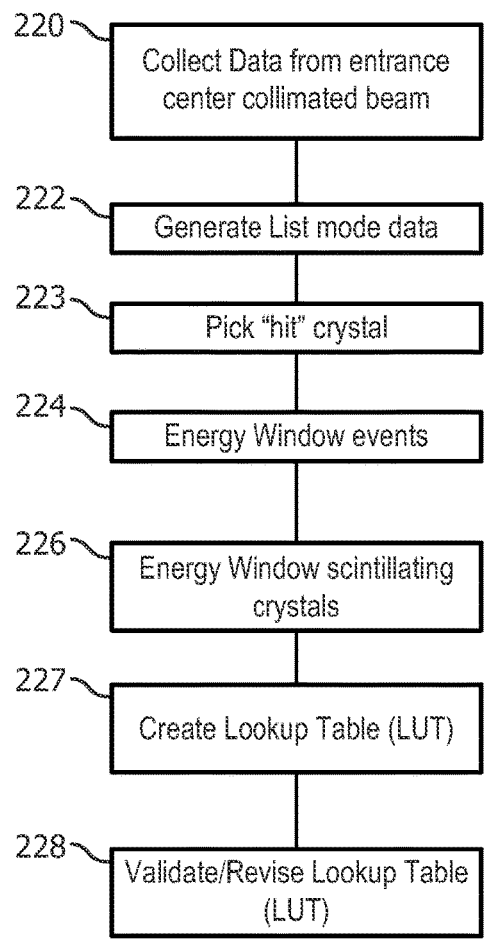
FIG. 9 flowcharts one method of an embodiment of in use calibrating a photon detector scintillator arrangement with light sharing and depth of interaction estimation.

With reference to FIG. 9, one method of an embodiment of in use calibrating a photon detector scintillator arrangement with light sharing and depth of interaction estimation is flowcharted. The in-use calibration of the photon detector can include adjacent scintillator arrays 24, such as the arrays located in the detector tile 20. In a step 220, the electronically collimated gamma radiation source 140 is directed at a center of the entrance end surface 76 of the one 60 crystal, e.g. center facing surface in the field of view of the imaging device 12, and the beam location recorded.

In a step 222 or by the DOI calibration unit 40, list mode data 44 is generated, which records the detected events. The list mode data 44 includes the signal energy values from each optical sensor 30, and the location indicator of the scintillating crystal or the one 60 crystal being calibrated.

In a step 223, the "hit" crystal for each event is identified. An energy window is applied to filter events in the list mode data 44 in a step or by a module 224. The energy window fits a Gaussian distribution to the generated signals by the optical sensors 30 of the die 22, i.e. summed signal of each die for the recorded events. This window is again optionally calculated independently for events occurring in each crystal (based on the "hit" crystal identified for the event in step 223) in order to account for differences in light collection. A window of three standard deviations (+3σ) of the generated signals is applied to generated signals of the recorded events, and values within are retained, i.e. filtered as signal values of the sensed luminescence.

An energy window is applied to filter the signals of sensed luminescence from scintillating crystal in the list mode data 44 in a step or by a module 226. The energy window fits a Gaussian distribution to the generated signals from the optical sensor 30 with the largest signal. Events with the signals of sensed luminescence from scintillating crystal within three standard deviations (+3σ) of the generated signal values of the scintillating crystal are retained for each crystal, which further minimizes Compton events in the list mode data 44.

The initial LUTs 38 are created in a step or by a module 227. In this step, the filtered list mode events from 226 are first sorted monotonically by the neighbor crystal ratio. The sorted events are then assigned to depth bins based on the expected number of events in each depth bin. An example of this sorting and assigning to depth bins is described in FIG. 5. The mean and variance of the four sensor signals is then calculated for each depth bin, the collection of with forms the initial LUT.

The LUTS 38 are optionally revised in a step or by a module 228. In one embodiment, the mean and variance LUTs are interpolated, smoothed, and/or filtered with a boxcar filter. In another embodiment, the LUTs are iterated through a maximum likelihood algorithm, which updates the mean and variance LUTs based on maximum likelihood estimation of the event DOIs.

The LUTS 38 can reference individual dies 22 or include multiple dies in the table with the die 22 and/or scintillator array 24 in the location indicator, i.e. a table referencing multiple arrays. For example, the location indicator in the LUTS includes a tile number, an x,y coordinate reference of each pixel in the tile, and a depth with a corresponding calibrated ratio.

Figure 10:
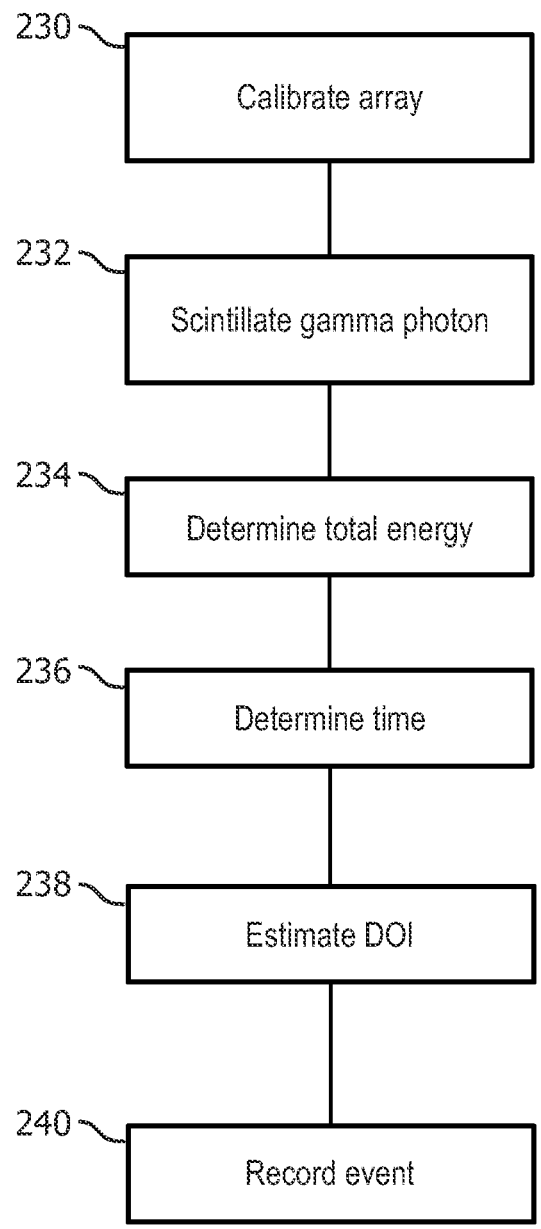
FIG. 10 flowcharts one method of an embodiment of using a photon detector scintillator arrangement with light sharing and depth of interaction estimation.

With reference to FIG. 10, one method of an embodiment of using a photon detector scintillator arrangement with light sharing and depth of interaction estimation is flowcharted. In a step 230, one or more 2×2 scintillator arrays 24 are calibrated using the front calibration as described in reference to FIG. 9. In a step 232, a gamma photon causes a scintillation in one of the four substantially identical scintillation crystal bars 26 in the scintillator array 24 at a DOI. The generated luminescence is shared with two adjacent scintillation crystals 68, 70 through light sharing portions of adjacent side surfaces according to the depth of scintillation. The luminescence is sensed by optical sensors 30. In one embodiment, the optical sensors 30 are coupled in a one-to-one coupling with the substantially identical scintillation crystal bars 26. In another embodiment, the optical sensors 30 are coupled in a four-to-one crystal/sensor coupling with the substantially identical scintillation crystal bars 26.

In a step, or by a module or circuit 234, a total energy is determined from the sensed luminescence of the scintillator array 24, i.e. sum of the signals generated by the optical sensors 30 coupled to the scintillator array 24 of a detected photon. In one embodiment, the sum uses values corresponding to the coupling between one scintillator array 24 and one optical sensor array 28.

In a step, or by a module or a circuit 236, a time of the detected photon scintillation is determined by the TDC 36 connected to optical sensors 30 coupled to the scintillator array 24. In one embodiment, the TDC 36 connects to four optical sensors 30, which are coupled one-to-one with the substantially identical scintillator crystal bars 26.

The depth of interaction is estimated in a step or by a module or a circuit 238. The depth of interaction is determined by the ratio of sensed luminescence from two other 68, 70 diagonal scintillator crystals adjacent to the scintillating crystal. The ratio is used with the LUTS 38 to estimate the depth of interaction.

In a step, or by a module or a circuit 240, the detected photon is recorded in the list mode data 44. The list mode data includes the total energy, the time, and the location indicator for the detected photon. The location indicator includes the location of the scintillation crystal and the depth of interaction estimate.

It is to be appreciated that, in connection with the particular illustrative embodiments presented herein, certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may, under suitable circumstances, be stand-alone elements or otherwise divided. Similarly, a plurality of particular functions described as being carried out by one particular element, may be carried out by a plurality of distinct elements acting independently to carry out individual functions, or certain individual functions may be split up and carried out by a plurality of distinct elements acting in concert. Alternately, some elements or components, otherwise described and/or shown herein as distinct from one another, may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

What is claimed is:

1. A photon detector, comprising:
a sensor array of optical sensors disposed in a plane, each optical sensor configured to sense light intensity;
a scintillator array of four scintillation crystal bars including a first scintillator crystal bar, a second scintillator crystal bar, a third scintillator crystal bar, and a fourth scintillator crystal bar, each of the four scintillation crystal bars being a rectangular prism with four side surfaces and first and second end surfaces, each scintillation crystal bar configured to generate a light scintillation in response to interacting with a received gamma photon, the four scintillator crystal bars being arranged such that:
the first scintillation crystal bar has a first face facing and adjacent a first face of the second scintillator crystal bar,
the first scintillation crystal bar has a second face facing and adjacent a first face of the third scintillator crystal bar,
the second scintillation crystal bar has a second face facing and adjacent a first face of the fourth scintillator crystal bar, and
the third scintillation crystal bar has a second face facing and adjacent a second face of the fourth scintillator crystal bar;
a first layer disposed in a first plane between and adjacent the first face of the first scintillation crystal bars and the first face of the second scintillation crystal bar with a first light sharing portion adjacent the first end surface and a first reflective portion adjacent the second end surface;
a second layer disposed in a second plane orthogonal to the first plane and disposed between and adjacent the second face of the first scintillation crystal bars and the first face of the third scintillation crystal bar with a second light sharing portion adjacent the second end surface and a second reflective portion adjacent the first end surface;
a third layer that is reflective and disposed adjacent to and covering third and fourth side surfaces of the first, second, third and fourth scintillation crystal bars, such that the scintillator array is optically isolated from adjacent scintillator arrays;
a signal processor connected to the sensor array configured to estimate a depth of interaction (DOI) of a gamma photon interacting with one of the first, second, third, and fourth scintillation crystal bars of the scintillator array based on a ratio of light sensed from only the first and fourth of the four scintillation crystal bars which are disposed diagonally to each other and/or a ratio of light sensed from only the second and third scintillation crystal bars which are disposed diagonally to each other.

2. The photon detector according to claim 1, wherein the reflective portion of the first layer and the reflective portion of the second layer includes a reflective film, and the light sharing portion of the first layer and the light sharing portion of the second layer optically couples the adjacent facing surfaces to each other.

3. The photon detector according to claim 1, further including:
a plurality of look-up tables configured to store values for the four scintillation crystal bars of the scintillator array which values relate the ratios of the light sensed by the diagonally disposed scintillation crystal bars to corresponding discrete values of the depth of interaction; and
wherein the signal processor is configured to estimate the depth of interaction using the stored values.

4. The photon detector according to claim 1, wherein the signal processor is configured to receive signals indicative of the light sensed by the sensor array, and to determine a total energy value of the detected gamma photon based on the light sensed from the first, second, third, and fourth scintillation crystal bars.

5. The photon detector according to claim 1, wherein the signal processor is further configured to generate a total energy value, a time value, and a location indicator for each detected gamma photon, and the location indicator includes the depth of interaction estimate and the location of the one of the four scintillation crystal bars in which the gamma photon was received.

6. The photon detector according to claim 1, further including:
a plurality of look-up tables (LUTS) configured to store for each of the four scintillation crystal bars values of calibrated ratios of sensed luminescence from two of the four scintillation crystal bars diagonal to each other and the corresponding depths of interaction; and
wherein the signal processor is configured to determine the depth of interaction by comparing the ratio of sensed light to the calibrated ratios of sensed luminescence and using as the determined depth of interaction one of the corresponding depth of interaction stored in the LUTS.

7. The photon detector according to claim 6, wherein the calibrated ratios of sensed light and the corresponding depths of interaction are based on a side calibration using an electronically collimated gamma radiation beam directed to a plurality of crystal depths.

8. The photon detector according to claim 6, wherein the calibrated ratios of sensed luminescence and the corresponding depths of interaction are based on an entrance surface calibration and depth separation from a monotonically changing ratio.

9. A nuclear imaging system including:
a plurality of photon detectors according to claim 1;
one or more processors configured to:
receive outputs from the optical sensors,
determine coincident pairs of scintillations that define line-of-responses (LOR),
identify the photon detectors that identify ends of each LOR, a time value for each scintillation of the photon detectors that identify ends of each LOR, and the depth of interaction for each photon detectors that identify ends of each LOR,
adjust end locations of each LOR based on the DOI, and
perform a time-of-flight reconstruction using the LORs to generate an image representation; and
a display device configured to display the generated image representation.

10. A method of detecting photons, comprising:
receiving a gamma photon with a square scintillator array;
generating light in response to the gamma photon interacting at a depth of interaction with one of four scintillation crystal bars disposed in the square scintillator array;
the square scintillator array including a first scintillation crystal bar, a second scintillation crystal bar, a third scintillation crystal bar, and a fourth scintillation crystal bar, the four scintillator crystal bars being arranged such that:

the first scintillation crystal bar has a first face facing and adjacent a first face of the second scintillation crystal bar, the first scintillation crystal bar has a second face facing and adjacent a first face of the third scintillator crystal bar, the second scintillation crystal bar has a second face facing and adjacent a first face of the fourth scintillation crystal bar, and the third scintillation crystal bar has a second face facing and adjacent a second face of the fourth scintillation crystal bar;

the square array further including a first layer disposed in a first plane between and adjacent the first face of the first scintillation crystal bar and the first face of the second scintillation crystal bar with a first light sharing portion adjacent a first end surface and a first reflective portion adjacent a second end surface and a second layer disposed in a second plane orthogonal to the first plane and disposed between and adjacent the second face of the first scintillation crystal bar and the first face of the third scintillation crystal bar with a second light sharing portion adjacent the second end surface and a second reflective portion adjacent the first end surface and a third layer that is reflective and disposed adjacent to and covering third and fourth side surfaces of the first, second, third and fourth scintillation crystal bars;

with a signal processor, estimating the depth of interaction based on a ratio of the light sensed from only the first and third scintillation crystal bars which are disposed diagonally to each other in the square scintillator array and/or a ratio of the light sensed from only the second and third crystal bars which are disposed diagonally to each other in the square scintillator array.

11. The method of detecting photons according to claim 10, further including:

determining a total energy of the light scintillation based on a sum of the light sensed from the four scintillation crystal bars.

12. The method of detecting photons according to claim 10, wherein estimating the depth of interaction includes using stored values corresponding to the four scintillation crystal bars and relating the ratio of the sensed light to discrete depth of interaction values.

13. The method of detecting photons according to claim 10, further including:

generating a total energy value, a time value, and a location indicator for each light scintillation, and the location indicator includes the depth of interaction and a location of a one of the four scintillation crystal bars in which the light scintillation was generated; and storing the generated total energy value, time value, and location indicator in a list mode in a non-transitory computer memory.

14. The method of detecting photons according to claim 10, further including:

storing in a look-up table for each of the four scintillation crystal bars values of calibrated ratios of the sensed light from the two of the four scintillation crystal bars disposed diagonally to each other and corresponding depths of the interaction; and wherein estimating the depths of interaction of the light scintillations compares the ratio of the sensed light to the calibrated ratios of the sensed light and uses for the depth of interaction of the corresponding depths of interaction from the look-up table.

15. The method of detecting photons according to claim 14, further including:

calibrating the ratios of the sensed light and the corresponding depths of interaction based on a side calibration using an electronically collimated radiation beam directed at a plurality of crystal depths centered along at least one of a third side surface opposite the first side surface and a fourth side surface opposite the second side surface.

16. The method of detecting photons according to claim 15, further including:

validating the calibrated ratios of the sensed light and the corresponding depths of interaction based on a front calibration using radiation directed at a center of the first side surface to generate a distribution of photon scintillation depths and corresponding validating ratios of the sensed light.

* * * * *